July 3, 1934.  A. W. WHEATON  1,964,835
VALVE
Filed Oct. 18, 1932  2 Sheets-Sheet 2
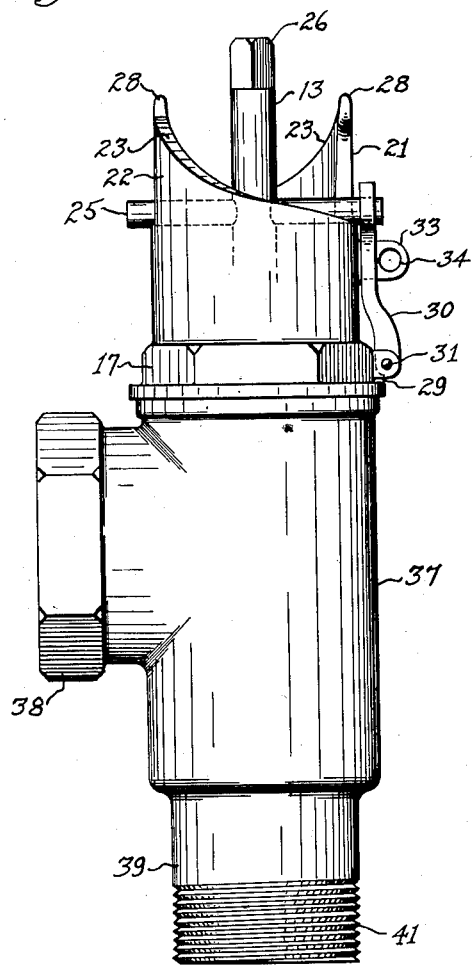
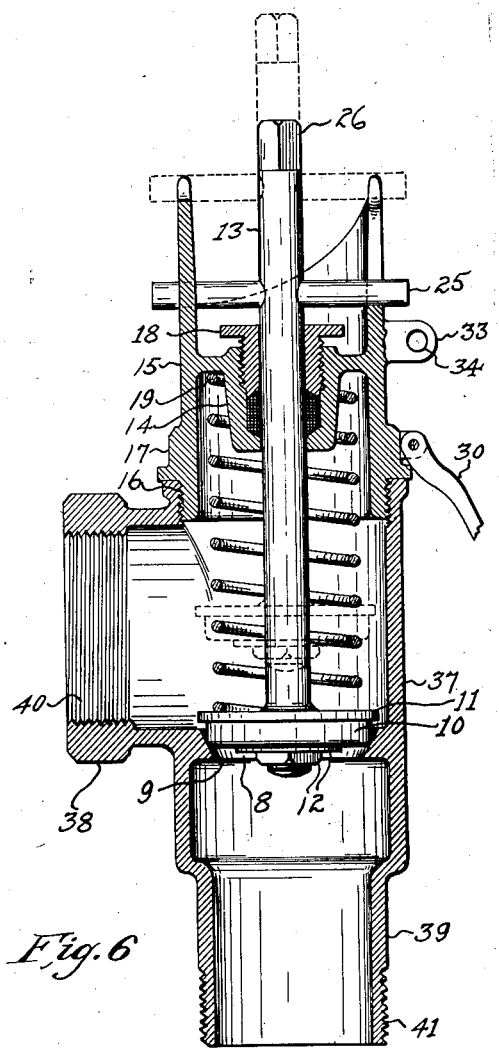
INVENTOR
Abram W. Wheaton,
BY
George D. Richards
ATTORNEY Patented July 3, 1934

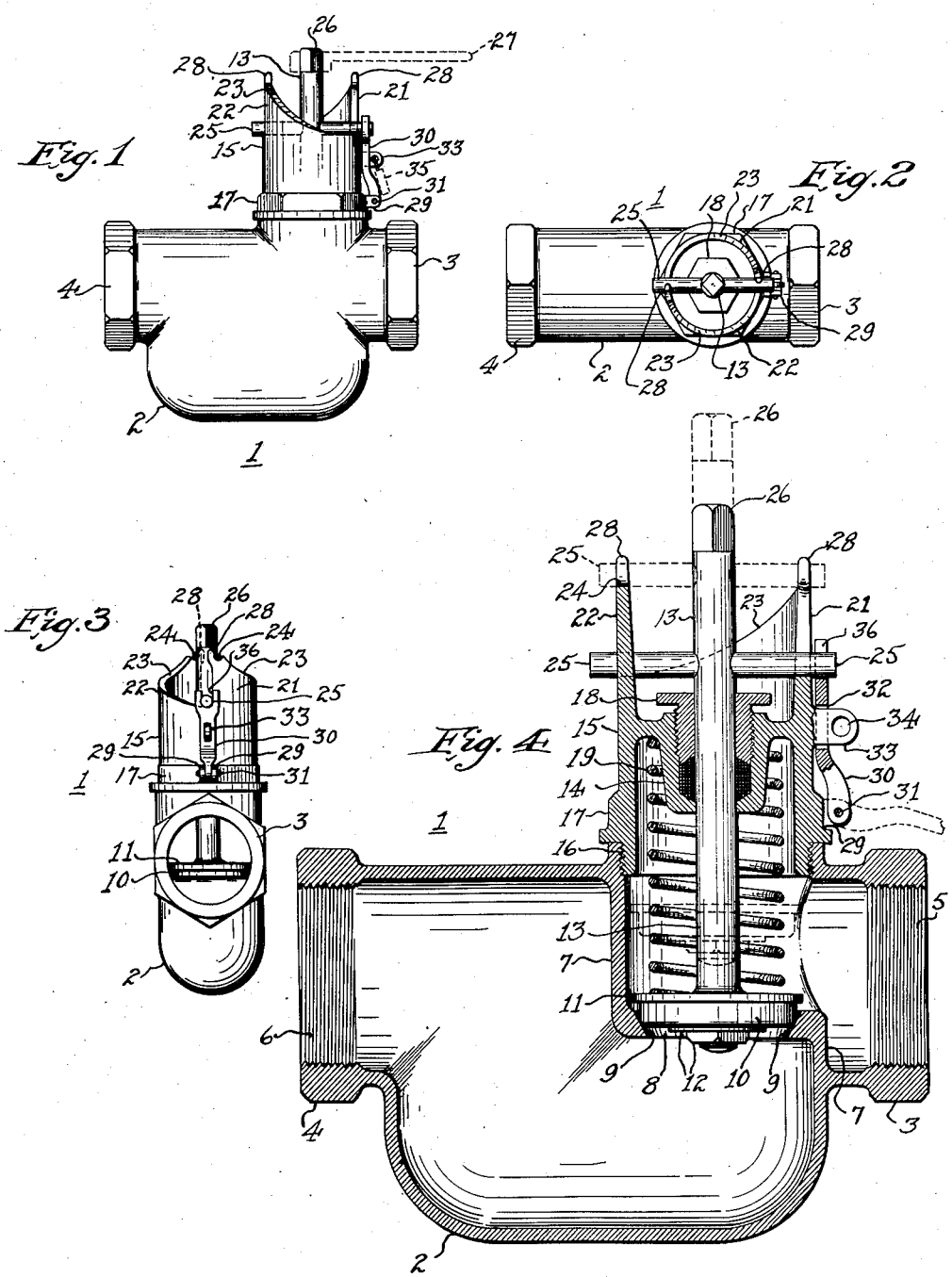

1,964,835

UNITED STATES PATENT OFFICE 1,964,835

VALVE

Abram W. Wheaton, Maplewood, N. J., assignor to A. W. Wheaton Brass Works, Newark, N. J., a corporation of New Jersey Application October 18, 1932, Serial No. 638,305

1 Claim. (Cl. 251—132)

This invention relates, generally, to valves; and the invention has reference, more particularly, to a novel valve suitable for various uses and especially adapted for use as a loading valve in installations employed for loading truck tanks with fuel, such as gasolene.

Many valves, heretofore employed as loading valves and for other purposes, have been more or less unsatisfactory in use owing to the tendency of such valves to close suddenly in use, thereby creating water or liquid hammer and setting up destructive back pressures which are injurious to mechanisms such as metering devices connected to the valve piping, said back pressures also tend to cause leakage in the piping, especially where packing is used. Also, many of these valves tend to chatter or vibrate during closing, resulting in rapid valve wear.

The principal object of the present invention is to provide a novel valve adapted for use as a loading valve and for other purposes, which valve is so constructed as to eliminate the creation of back pressure and water or liquid hammer, the said valve being easily and positively controlled during its closing movement so that the same may be closed slowly and smoothly and without chattering.

Another object of the present invention lies in the provision of a novel valve of the above character having a valve disc which is controlled in its movement by complementary helical cams cooperating with the valve stem, said complementary cams serving to effect the smooth and gradual closing of the valve in use to effectively prevent water or liquid hammer.

Still another object of the present invention is to provide a novel valve of the above character which is of simple and durable construction and which is so constructed and arranged as to prevent the unauthorized opening thereof, the same having an extremely long life in use and the parts of which are readily accessible for purposes of replacement or repair.

Other objects of this invention, not at this time more particularly enumerated, will be clearly understood from the following detailed description of the same.

The invention is clearly illustrated in the accompanying drawings, in which:

Fig. 1 is a view in elevation of the novel valve of the present invention, the same being illustrated as adapted for midline location.

Fig. 2 is a plan view of the structure shown in Fig. 1.

Fig. 3 is a view in end elevation of the structure shown in Fig. 1.

Fig. 4 is an enlarged vertical sectional view of the structure shown in Fig. 1.

Fig. 5 is a view in elevation of the novel valve of this invention having a casing of angle formation; and Fig. 6 is a vertical sectional view of the structure shown in Fig. 5.

Similar characters of reference are employed in all of the above described views to indicate corresponding parts.

Referring now to Figs. 1 to 4 of the drawings, the reference numeral 1 designates the novel valve of this invention as a whole, the said valve having a valve casing provided with aligned inlet and outlet openings adapting the valve for midline use. Valve 1 comprises a casing 2 having inlet and outlet branches 3 and 4, respectively, which branches are internally threaded at 5 and 6, respectively, for receiving piping, the outer end portions of said branches having hexagonal surfaces for facilitating the threading of pipe into these branches. The casing 2 is formed internally with a partition 7 having a vertical valve opening 8 therein, which valve opening is surrounded by a horizontally disposed, tapered or conical valve seat 9.

A valve disk 10 of rubber, composition, leather or other suitable material, is adapted to cooperate with the valve seat 9. Valve disk 10 is carried by a valve disk holder or piston 11, the said valve disk being retained in assembled relation upon the valve disk holder 11, as by means of a washer and nut assembly 12. The valve disk holder or piston 11 is fixed upon the lower end portion of a vertically extending valve stem 13. The valve stem 13 extends upwardly and through a central conforming aperture provided in a depending stuffing box 14 formed on a cap member 15. The stuffing box 14 is illustrated as having a threaded gland 18 for compressing packing around the valve stem 13.

The cap member 15 is threaded at 16 into an opening provided in the top of casing 2. Cap member 15 is illustrated as formed with a hexagonal portion 17 to facilitate the ready threading of this cap member into the casing 2. A coil compression spring 19 has its upper portion surrounding the stuffing box 14 and engaging the cap member 15 while its lower portion presses upon the upper surface of the valve disk holder 11. Spring 19 by pressing downwardly upon valve disk holder 11 tends to retain valve disk 10 upon its seat 9, thereby retaining the valve in closed condition.

The upper portion of cap member 15 is formed to provide two complementary, oppositely disposed cams 21 and 22. The cams 21 and 22 are similar and have upper working surfaces or faces 23 of helical formation, the said working surfaces extending along helical lines having the axis of the valve stem 13 as their center. Each of the cams 21 and 22 are of substantially semicircular shape in plan, so that each of these cams therefor extends substantially 180° about the valve stem 13. The low point of the working surface of one of these cams is positioned adjacent the high point of the working surface of the other of these cams, the low points of the working faces of the cams being disposed on a diametric line. The high points of the working surfaces of the cams are also disposed on a diametric line and these high points are illustrated as provided with notches 24 for receiving and retaining a transverse pin 25 that extends through and is secured to the valve stem 13. The end portions of the pin 25 in use are adapted to rest upon and ride over the working surfaces 23 of the complementary cams 21 and 22. Thus, in the several figures the transverse pin 25 is illustrated as engaging the low points of the working surfaces 23 of the cams 21 and 22.

The upper portion of the valve stem 13 projects above the complementary helical cams 21 and 22 and is of square formation, as indicated at 26 for the purpose of receiving a suitable operating wrench, such as the wrench 27 shown in dotted lines in Fig. 1. By applying the wrench 27 to the valve stem 13, the same may be caused to turn in a clockwise direction, as viewed in Fig. 2, thereby causing the end portions of pin 25 to ride upwardly from the low points of the cams 21 and 22 and along the working surfaces thereof, thereby effecting the lifting of valve disk 10 from its seat 9. Continued clockwise turning of the wrench 27 will cause the end portions of pin 25 to ultimately enter the notches 24 and come to rest, as shown in dotted lines in Fig. 4. Cams 21 and 22 are illustrated as formed with upwardly directed stop projections 28 for preventing further turning movement of the valve stem 13 in a clockwise direction.

When it is desired to again close the valve, it is merely necessary to turn the valve stem 13 in the reverse or counterclockwise direction, as viewed in Fig. 2, so that the end portions of pin 25 will move out of notches 24 whereupon the closing spring 19 will serve to cause pin 25 to ride downwardly over the working surfaces 23, thereby lowering and turning valve stem 13 and causing valve disk 10 to move towards its seat 9. The helical inclination of the working surfaces 23 is made such as to cause pin 25 to move over these surfaces with a slow and substantially uniform motion, thereby causing the valve disk 10 to approach its seat 9 at a slow, definite rate and without vibration or chattering. Owing to the regularity of the downward movement of the valve disk 10, the closing operation of the valve disk is not hastened, and the same approaches its seat with a slow steady motion, thereby gradually shutting off the flow of liquid through the valve in use, and preventing the creation of water or liquid hammer or injurious back pressures.

If desired, the slope of the working surfaces 23 of cams 21 and 22 in the region adjacent the low points of these cams may be made less than the slope of the remaining portions of these cams, so that during the final closing movement of the valve disc 10, the same will move slower than during the initial part of the closing movement thereof, thereby effecting a very gradual closing of the valve and positively preventing water or liquid hammer. Also, in some installations the notches 24 may be omitted, thereby requiring the operator to hold the valve open in use, so that when he releases his pressure upon wrench 27 the valve will automatically close. This automatic closing of the valve prevents waste and is especially valuable in installations handling highly inflammable fuels, in which case such automatic closing serves as a fire preventive.

The cap member 15 is illustrated as provided with lugs 29 upon which is pivotally mounted a locking link or arm 30 as by means of a pivotal pin 31. The locking link 30 is provided with a slot or aperture 32 for receiving a conforming lock projection 33 provided on the cap member 15. Lock projection 33 has an aperture 34 extending therethrough for receiving a padlock, such as the padlock 35 shown in dotted lines in Fig. 1. The free end portion of the locking link 30 is bifurcated at 36 for engaging one end portion of the pin 25, as illustrated in the figures, and with the padlock 35 engaged through the aperture 34 of projection 33, the valve stem is locked against turning, thereby retaining the valve in closed position. By unlocking and removing the padlock 35 from aperture 34, the locking link 30 may be turned downwardly, as shown in Fig. 4, thereby releasing pin 25, whereupon the valve may be actuated to open position. This locking feature of the valve is desirable in order to prevent the theft of valuable fuels or other liquids.

In Figs. 5 and 6, the valve casing 37 is illustrated as of the angle type having an inlet branch 38 and an outlet branch 39. The inlet branch 38 is illustrated as internally threaded at 40 for receiving piping and the outlet branch 39 is illustrated as externally threaded at 41 for receiving a spider or other fitting. The remaining parts of the valve in Figs. 5 and 6 are of similar construction to that shown in the preceding figures and hence these parts are similarly numbered. The operation of this valve is the same as that described in connection with Figs. 1 to 4 and would appear to require no further description.

It will be noted that, owing to the use of the complementary cams 21 and 22, the closing movement of the valve disc 10 is positively controlled so that this valve disc is prevented from closing suddenly as the same approaches its seat, thereby overcoming the strong tendency for such rapid closing to take place due to the dynamic pressure of the flowing fluid and to the action of spring 19. The rate of downward movement of the pin 25 and hence of the valve disc 10 is strictly controlled by the degree of slope of the cam working surfaces 23, so that any desired rate of closing may be obtained to suit the requirements of different uses.

As many changes could be made in the above construction and many apparently widely different embodiments of this invention could be made without departing from the scope thereof, as defined by the following claim, it is intended that all matter contained in the above description or shown in the accompanying drawings shall be interpreted as illustrative and not in a limiting sense.

What is claimed is:

In a valve of the kind described, a casing having inlet and outlet openings, a valve within said casing for controlling the flow of fluid through said casing, said valve having a valve stem projecting externally of said casing, complementary cams disposed externally of said casing and adjacent said valve stem, a pin carried by said valve stem and cooperating with said cams, said valve stem being turnable whereby said pin is caused to ride on said cams, thereby causing the operation of said valve, and a locking member mounted externally of said casing for engaging and holding said pin against movement at one end of its travel, thereby locking said valve in closed position.

ABRAM W. WHEATON.